United States Patent [19]

Lavelle

[11] Patent Number: 4,902,882

[45] Date of Patent: Feb. 20, 1990

[54] CODE READER

[75] Inventor: Gary E. Lavelle, Avon, Conn.

[73] Assignee: Emhart Industries, Inc., Farmington, Conn.

[21] Appl. No.: 99,924

[22] Filed: Sep. 23, 1987

[51] Int. Cl.⁴ .............................................. G06K 5/00
[52] U.S. Cl. .................................... 235/382; 235/436; 235/437; 235/449; 340/825.31
[58] Field of Search ................ 235/382, 436, 437, 449, 235/493; 340/825.31

[56] References Cited

U.S. PATENT DOCUMENTS 3,704,360 11/1972 McFadden .......................... 235/480
4,013,997 3/1977 Treadwell ....................... 235/437 X
4,024,379 5/1977 Pfost et al. ...................... 235/449 X
4,743,898 5/1988 Imedio ............................ 235/382 X Primary Examiner—David L. Trafton
Attorney, Agent, or Firm—Barry E. Deutsch; Carl A. Forest

[57] ABSTRACT

A reliable electronic lock comprises means for reading a key card upon insertion and withdrawal. Sets of data read from the key card are compared to CRC data read from the key card to determine which set contains actual data and no false data erroneously read by the electronic lock. The CRC data is stored in scrambled form on the card to minimize the possibility of match to a set of actual and false data.

20 Claims, 10 Drawing Sheets

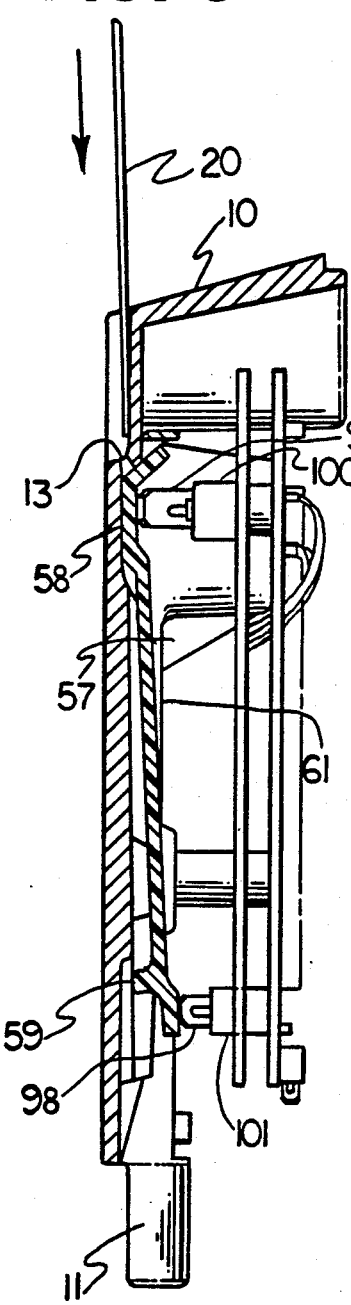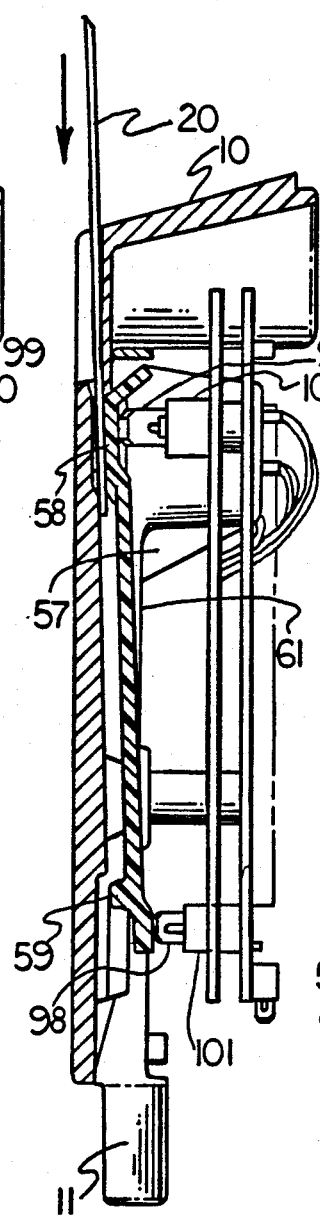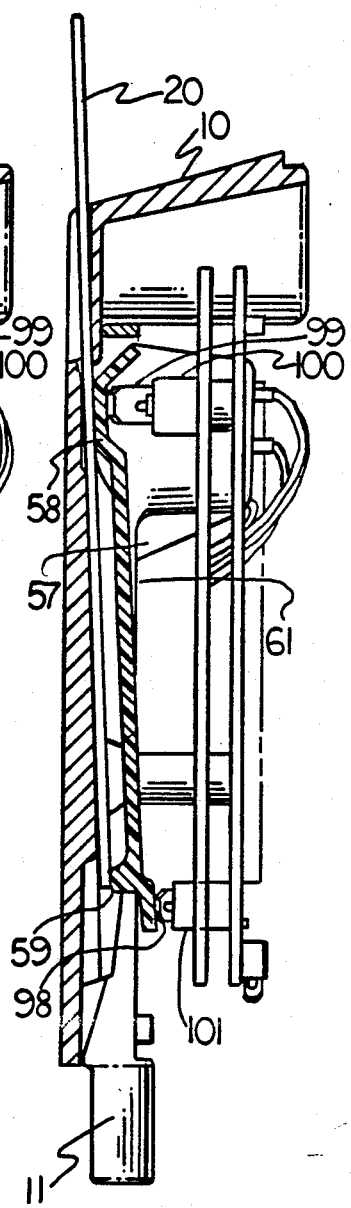

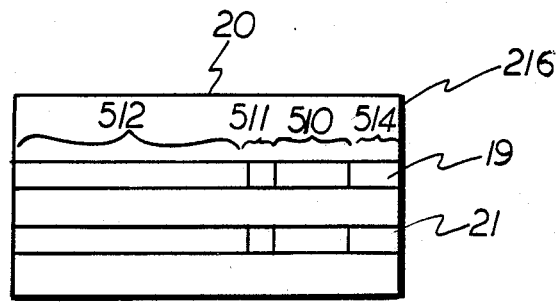
FIG. 10
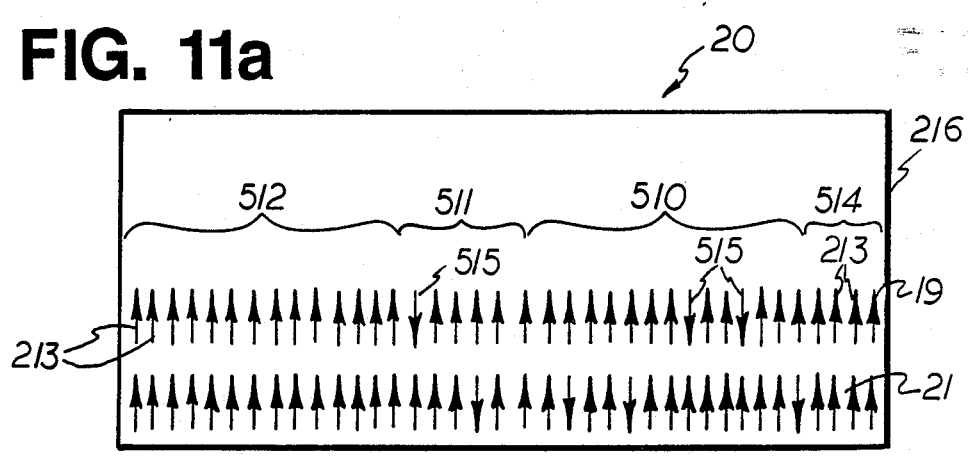
FIG. 11a
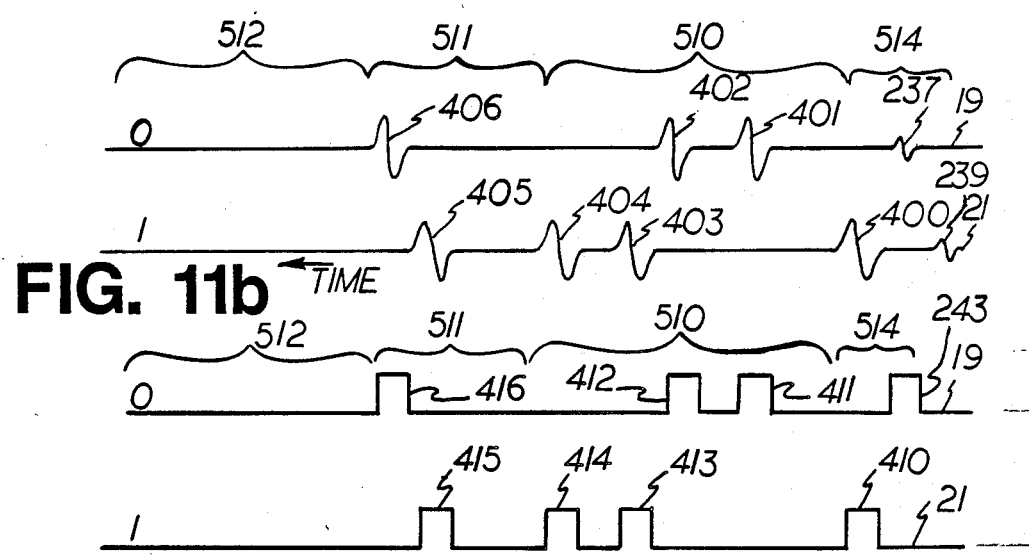
FIG. 11b
FIG. 11c

CODE READER

BACKGROUND OF THE INVENTION

The invention relates generally to electronic locking systems and deals more particularly with a card reader for reliably reading data from key cards.

U.S. Pat. No. 4,126,780 discloses an optical card reader having a spring to bias the card away from the light detector and a photo-electric bottom detector to produce a signal when the card reaches the bottom of the reader.

U.S. Pat. No. 4,519,228 discloses an electronic recodeable lock which includes a magnetic or optical card reader. The card reader includes a lever activated switch which turns on the reading head when the key is inserted into the slot and an end switch which turns the reading head off when the key reaches the end of the slot.

U.S. Pat. No. 3,896,293 discloses a card reader having a constant velocity card transport mechanism. This reader utilizes a cantilever spring to urge a roller against the card so that the coded portion of the card will be forced against the read head.

U.S. Pat. No. RE29,846 discloses an electronic lock system which includes a key card reader. This card reader contains a microswitch to activate the read sensors after the card has been fully inserted.

U.S. Pat. No. 3,622,991 discloses an electronic locking system which includes an optical card reader system. This card reader utilizes a shutter which is capable of limited pivotal movement to insure correct orientation of the key card in the slot.

In addition, various cyclical redundancy checking (CRC) processes were previously known to determine whether data read from a disc drive or data tape system is true. The CRC data is stored on the disc drive or tape along with the data. Such data was read at constant velocity in one direction as the tape or disc was driven by a machine process. Also, a linear redundancy checking (LRC) process was previously known to determine whether data stored on a credit card was true. The LRC was performed as data was read in one direction and comprised a parity bit for each of the data bits.

Problems presented by prior art card readers, such as those described above, include misreading the data contained on the cards. Such problems are particularly troublesome for card readers utilized for electronic door locks because the insertion of the correct card key will not result in opening the lock.

Misreading may be caused by a misalignment of the card with the read head. In addition, misreading may occur because the card does not move past the read head at adequate velocity. Also, misreading may be due to start-up conditions. If a key card contains a serial magnetic track, it may be difficult to read the first bit on the track, as discussed in more detail below.

It is an object of the present invention to provide a card reader that reliably reads data on the cards.

SUMMARY OF THE INVENTION

The invention resides in an electronic lock having means for reading a set of actual data from a key card, and memory means coupled to the reading means for storing the set of actual data and also storing false data erroneously read by the reading means. According to one feature of the invention, means are provided for shifting through the memory means to the locations of a plurality of sets of said actual and false data. A first one of the sets includes both the actual data and false data and a second one of said sets includes the actual data and none of the false data. Processing means coupled to the shifting means determines that the first set contains some of the false data and the second set contains the actual data and none of the false data. Means coupled to the processing means compares the actual data within the second set to a lock combination stored within the locking apparatus and operates the locking apparatus if the comparison is favorable. Consequently, the erroneous reading of false data along with the actual data does not frustrate the electronic locking apparatus.

According to another feature of the invention, the data on the key card is read both during insertion and withdrawal of the key card to improve reliability.

According to another feature of the invention, the key card contains validity data such as CRC data which corresponds to the actual data. The processing means compares the sets of actual data to the validity data read from the key card to locate the actual data. The validity data may be stored on the key card in scrambled form to minimize the risk of accidental match to false data read from the key card.

BRIEF DESCRIPTION OF THE DRAWINGS

FIGS. 3, 4 and 5 are side sectional views of the reader taken along section line 1—1 with the card prior to insertion, partially inserted and fully inserted.

FIG. 10 is a schematic diagram of the key card and data thereon of FIG. 1.

FIG. 11(a) is an enlarged schematic diagram of the key card and data of FIG. 10. FIG. 11(b) illustrates electronic waveforms produced by the card reader of FIG. 8 as the card is inserted into the electronic lock and FIG. 11(c) illustrates the electronic waveforms of FIG. 11(b) after processing by the electronic module of FIG. 1.

DESCRIPTION OF THE PREFERRED EMBODIMENT

Figure 1:
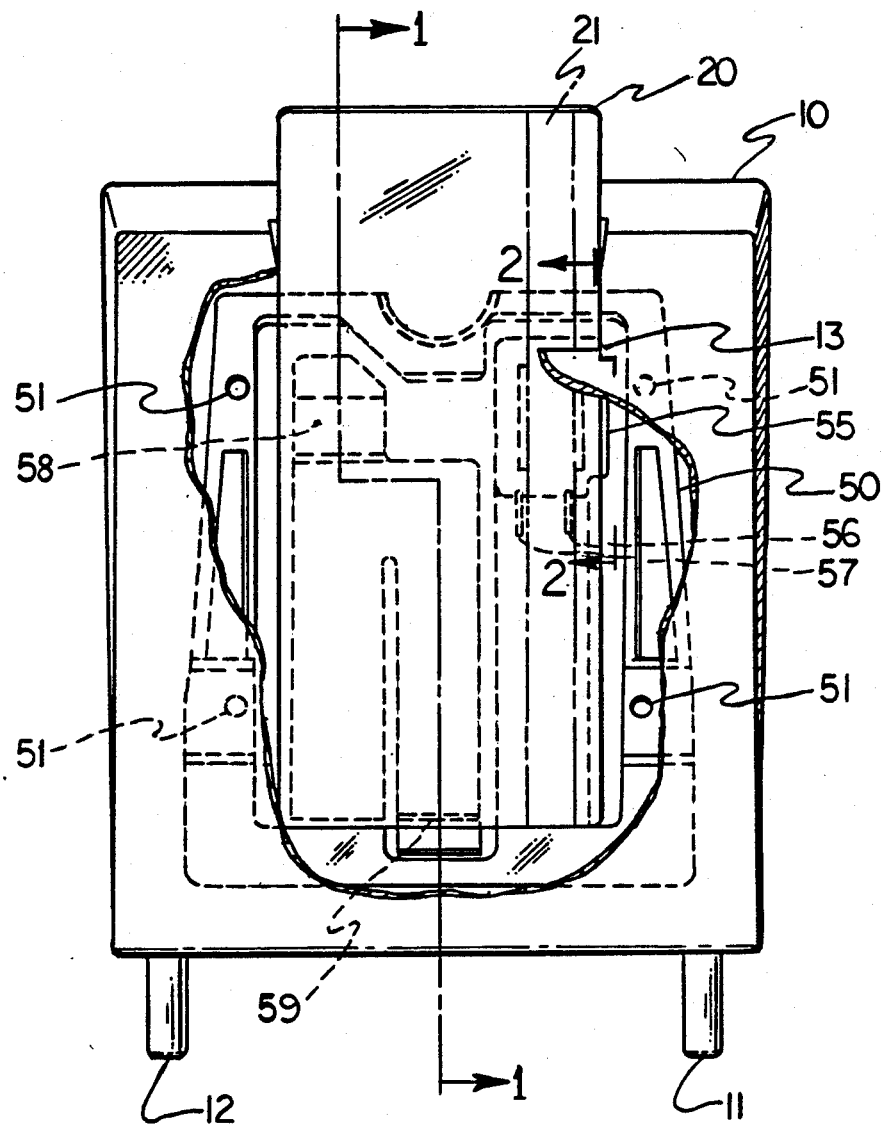
FIG. 1 shows a card reader according to the present invention with a portion of the outside cover broken away to show a card fully inserted and a card reader spring in phantom.
Figure 2:
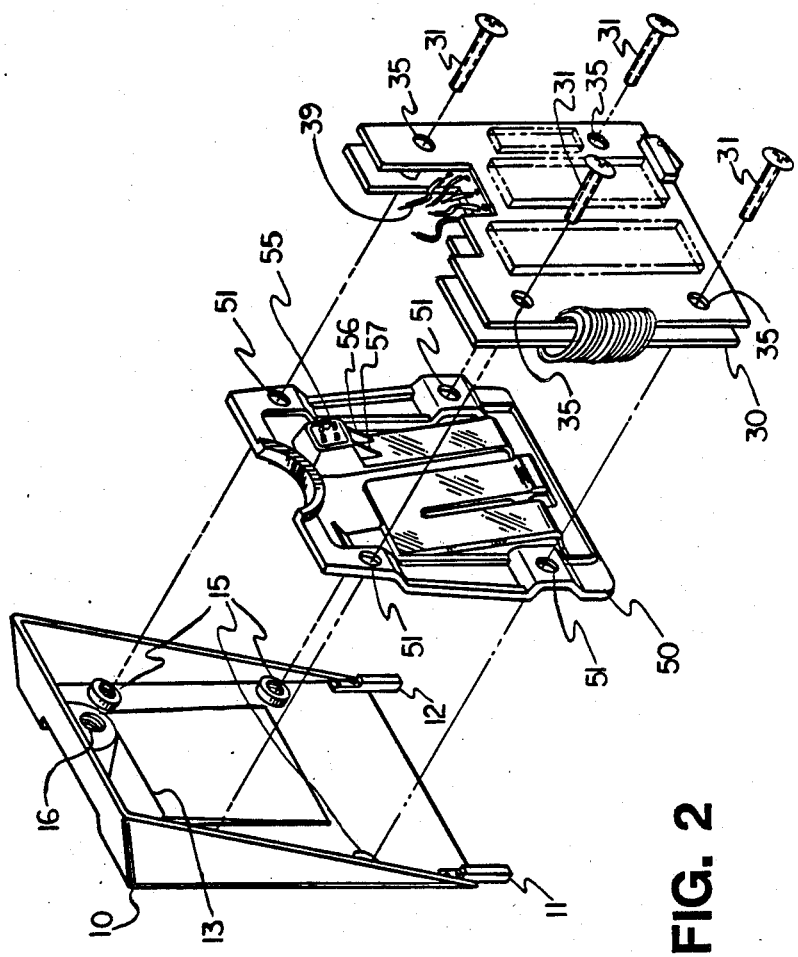
FIG. 2 is an exploded view of the card reader of FIG. 1, showing an outside cover, card reader spring and electronic module.
Figure 8:
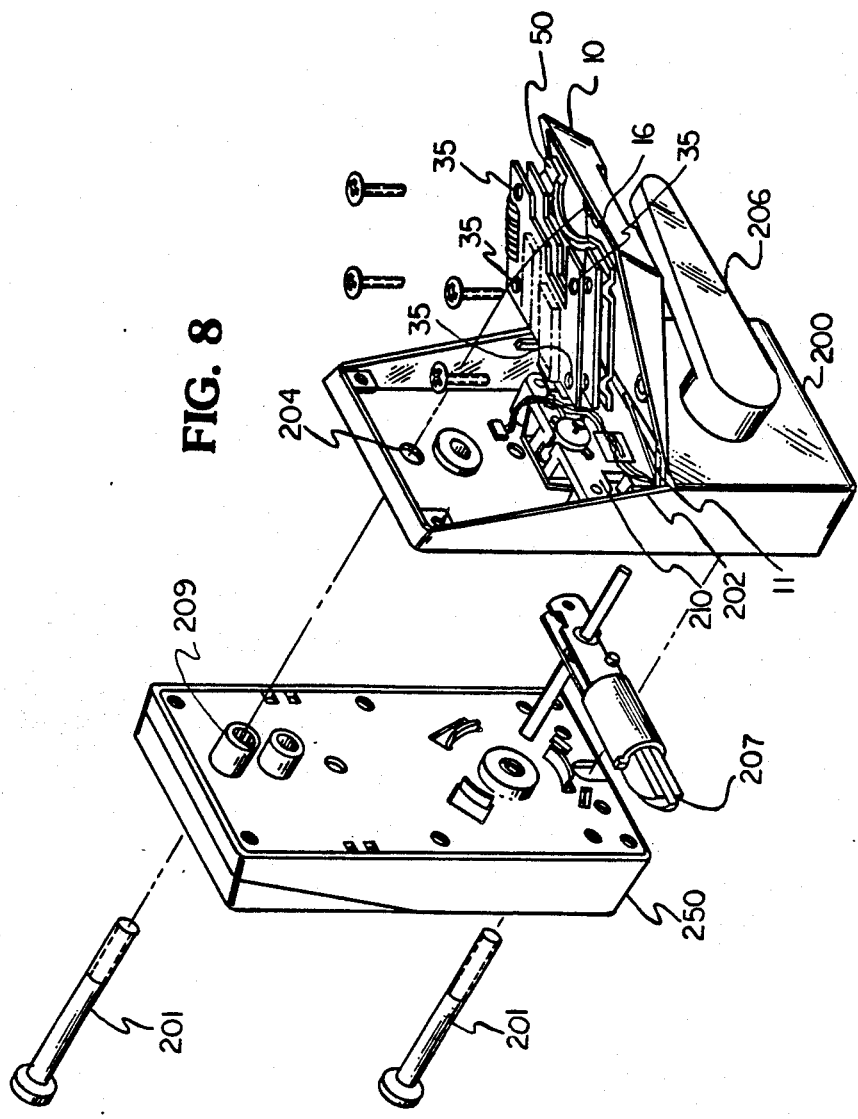
FIG. 8 shows the card reader used as part of an electronic door lock system.

FIGS. 1, 2 and 8 illustrate a card reader according to the present invention including an outside cover 10 having a slot 13 sized to accept a card 20 which contains a single magnetic strip having two tracks 19 and 21.

Two protruding arms 11 and 12 are positioned to be received by the apparatus in which the card reader is employed. A card reader spring 50 and electronic module 30 are attached to the inside of cover 10 by means of screws 31 through holes 35 of the electronic module and through holes 51 of spring 50. The screws attach into threaded holes 15 in bosses on the inside of cover 10. The card reader is secured to the apparatus in which it is employed by screw means into threaded hole 16.

A magnetic read head 55 is attached to one arm of card reader spring 50 by means of any suitable adhesive, such as, for example, an anaerobic or moisture curable adhesive. The spring 50 has a frame or base portion to which two arms 60 and 61 are attached. The base of the spring can accommodate one or more indented areas 62 and 63 for structural rigidity. Right arm 61 is generally rectangular and attached to the base of the spring. The read head 55 is attached to the right arm 61 at the end opposite the attachment to the base. Supports 56 and 57 are provided for structural rigidity. Right arm 61 is biased toward the outside cover 10 of the card reader and is adapted to urge read head 55 toward card 20. Left arm 60 is generally shaped like a small "h" with only the lower left portion of the "h" being attached to the base of the spring. Left arm 60 has two pivot points which allows it to perform two functions. The approximate locations of the pivot points are identified by numerals 40 and 41. The upper portion of the left arm of the spring has an indented configuration with a crown 58 located at the top of the "h" (see in particular FIG. 7). The lower right portion of the "h" shaped left arm contains another raised portion identified by the numeral 59. Microswitch 100 (FIG. 3) is located under crown 58 and microswitch 101 is located under raised portion 59 of the left arm 60 of spring 50. The left arm 60 of spring 50 is also responsive to insertion of said card and is biased away from microswitches 100 and 101 and toward outside cover 10 of the card reader. Sensors, such as optical or Hall effect, may be utilized in lieu of microswitches 100, 101 without departing from the spirit of the present invention.

Read head 55 may be any magnetic strip reader, but preferably is Model SLP-5261 made by Shokai Co. The read head is connected to the electronic module by means of wires 39.

Referring to FIGS. 3, 4 and 5, the operation of the card reader will be explained in greater detail. In FIG. 3, the card 20 is positioned immediately outside of the slot 13. Microswitch 100 is in an open or "off" position and crown portion 58 of arm 60 of spring 50 and head 55 are shown biased against outside cover 10. As card 20 is inserted through slot 13 and into the passage, it moves past crown portion 58 of spring 50 (see FIG. 4). Spring 50 deflects to the left as viewed in the Figure and depresses lever 99 and this actuates microswitch 100, which activates the electronic module as well as read head 55. FIG. 4 depicts microswitch 100 in a depressed or "on" position. Read head 55 reads data contained on card 20 as the data is pushed past the center of read head 55. At the end of the passage, card 20 encounters raised portion 59 of spring 50 (see FIG. 5). At this encounter, spring 50 deflects, depresses lever 98 and thus actuates microswitch 101. FIG. 5 depicts microswitch 101 in a depressed or "on" position. Microswitch 101 signals to the electronic circuitry that the insert reading has ended and that withdrawal reading should begin.

When microswitch 101 is actuated, microswitch 100 is still engaged and thus read head 55 is still activated. Microswitch 101 performs two functions. First, it signals to the electronic module 30 that the travel of the card has been completed, so that the information read by the read head can be transmitted to the logic circuitry where it can be compared with the information stored therein to determine if the information matches and the lock can be opened. Secondly, it signals the electronic module to begin accepting information from a second reading, this second reading occurring as the card is withdrawn. Thus, if the reader incorrectly reads the information on insertion of the card, it is given another chance to reread the information as the card is withdrawn. In this manner, the system is given two chances each time the card is inserted.

Figure 6:
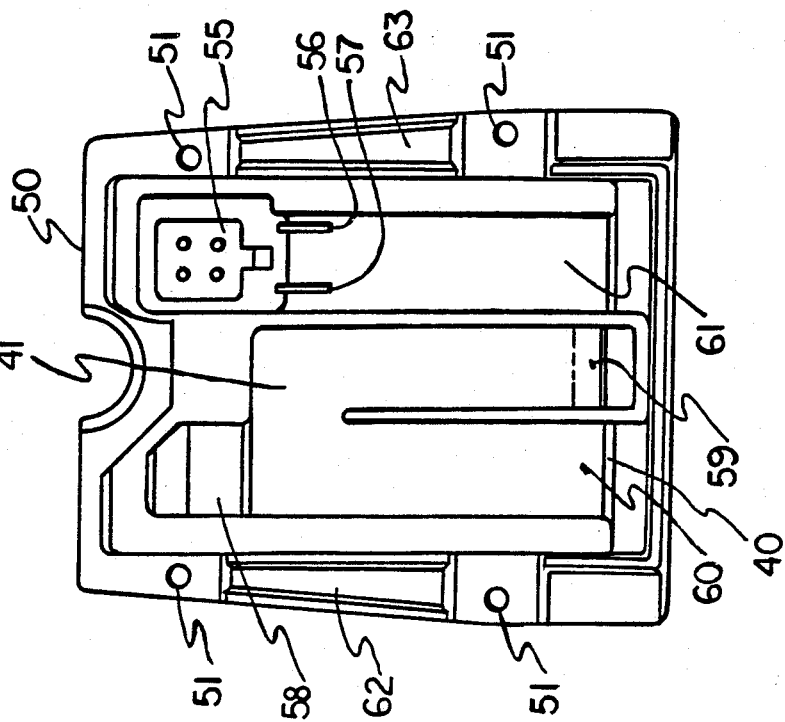
FIGS. 6 and 7 show the electronic module.
Figure 7:
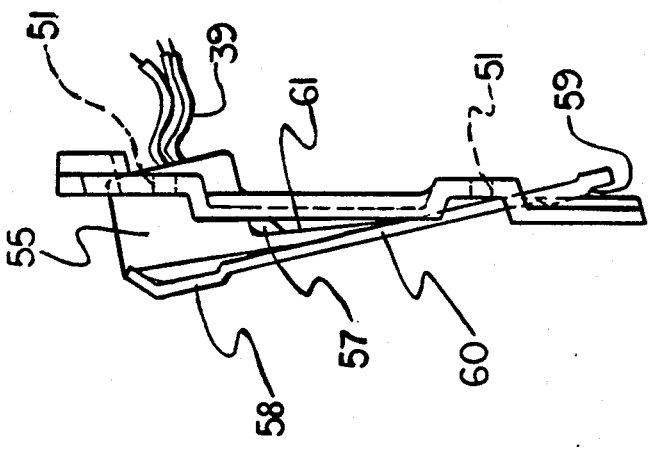

Referring to FIGS. 6 and 7, the electronic module 30 contains the electronic and logic circuitry to operate the reader. In addition, the module may contain circuitry to operate a device such as an electronic lock. Power is supplied by batteries 219 (shown in FIG. 9) which, by way of example, are three, 3 volt lithium batteries, connected in series to produce a 9 volt source.

The card reader is illustrated as a part of an electronic lock in FIG. 8. The preferred electronic door lock with which the present invention can be utilized comprises a housing 200, outside handle 206, outside operating mechanism 210, an inside operating mechanism (not shown), latch bolt assembly 207, inside housing 250 and an inside handle (not shown). A strike box and strike plate are mounted on the door jamb in a conventional manner.

The card reader, including outside cover 10, spring 50, and electronic module 30, is located in the housing 200 of the electronic lock. The card reader is secured to the lock by protrusions 11 and 12 and by screw 201. Tabs 202 are positioned so that protrusions 11 and 12 can rest against them and hold the card reader in a relatively horizontal position for servicing. Screw 201 is positioned so that access is from the inside of the door. Screw 201 fits through a hole 209 in inside housing 250 of the electronic lock, through hole 204 in the back plate of outside portion 200 and is secured within the card reader threaded hole 16.

For further details of portions of the locking apparatus 7, reference may be made to allowed U.S. patent application Ser. No.07/099929, filed by George Frolov, same day herewith entitled "IMPROVED CARD READER" which patent application is hereby incorporated by reference as part of the present disclosure.

Figure 9:
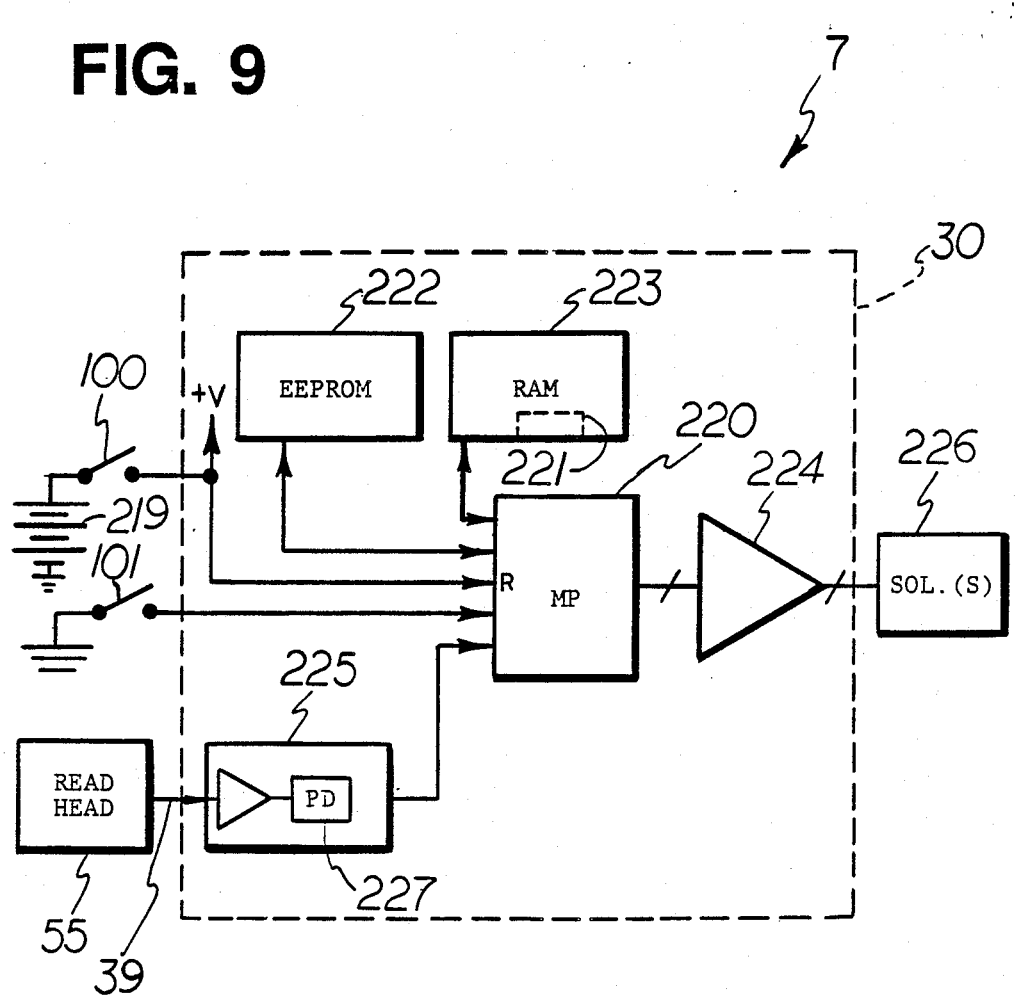
FIG. 9 is a block diagram which schematically illustrates circuitry within the electronic module of FIG. 2.

FIG. 9 illustrates electronic components within the electronic module 30. These components include a microprocessor 220, an electrically erasable programmable read-only memory (EEPROM) 222 which stores lock combinations and supplies an operating program or firmware to the microprocessor 220 and a random access memory (RAM) 223 which stores one or more lock combinations and other data read from the key card 20. By way of example, the microprocessor 220 and RAM 223 may be provided by a microcomputer. After reading such a lock combination obtained from the key card, the microprocessor 220 compares the lock combination to one or more lock combinations stored in the EEPROM 222, and if there is match, the microprocessor activates one or more drivers 224 to drive one or more solenoids 226 involved with opening the locking apparatus 7.

The electronic module 30 also comprises a read circuit 225 which contains a peak detector 227 which read circuit is connected to the output of the read head 55 and converts such output to digital form for transmission to the microprocessor 220 as described below. The microprocessor also connects to the outputs of the switches 100 and 101 to detect when the key card 20 has initially entered the slot in the locking apparatus 7 and has become fully inserted in the locking apparatus 7, respectively. For more details of the drivers 224 and the associated solenoids 226 and how they operate the locking apparatus, reference may be made to an allowed U.S patent application Ser. No. 07/099937, filed concurrently herewith entitled "LOCKING MECHANISM FOR MULTIFUNCTIONAL ELECTRONIC LOCK" by George Frolov and hereby incorporated by reference as part of the present disclosure.

FIG. 10 schematically illustrates the magnetic card 20 and its two magnetic tracks 19 and 21 each of which comprises a data portion 510, a CRC portion 511 and two portions 512 and 514 which are devoid of information. The portion 514 of each magnetic track borders on a front edge 216 of the key card 20.

FIG. 11(a) further illustrates the magnetic tracks 19 and 21 of the key card 20 in schematic form. In the portions 512 and 514, all of the magnetic data bits are polarized in the same direction as indicated by upwardly pointing arrows 213, 213. In the data portion 510 and the CRC portion 511, data bits are represented by oppositely polarized magnetic flux reversals and are illustrated by downwardly pointing arrows 515, 515. The downwardly pointing arrows in the magnetic track 19 represent binary zero data bits and the downwardly pointing arrows in the magnetic strip 21 represent binary one data bits. Consequently, the key card 20 contains the data portion bits 10011 beginning from the front of the data portion 510 and subsequent CRC portion bits 10.

Figure 12A:
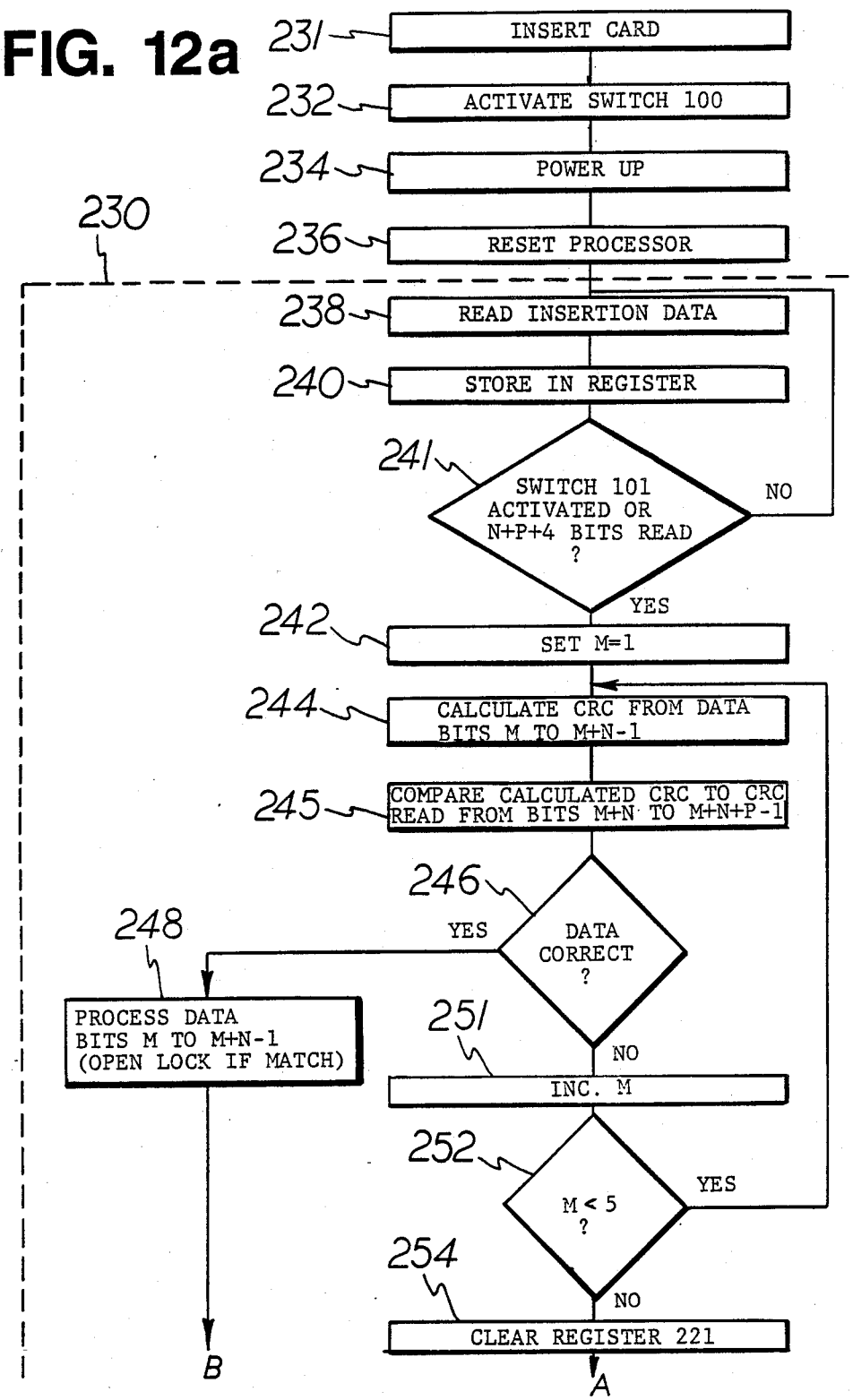
FIG. 12(a) is a top portion and FIG. 12(b) is the bottom portion of a flowchart including a computer program within the electronic module for reading the key card.
Figure 12B:
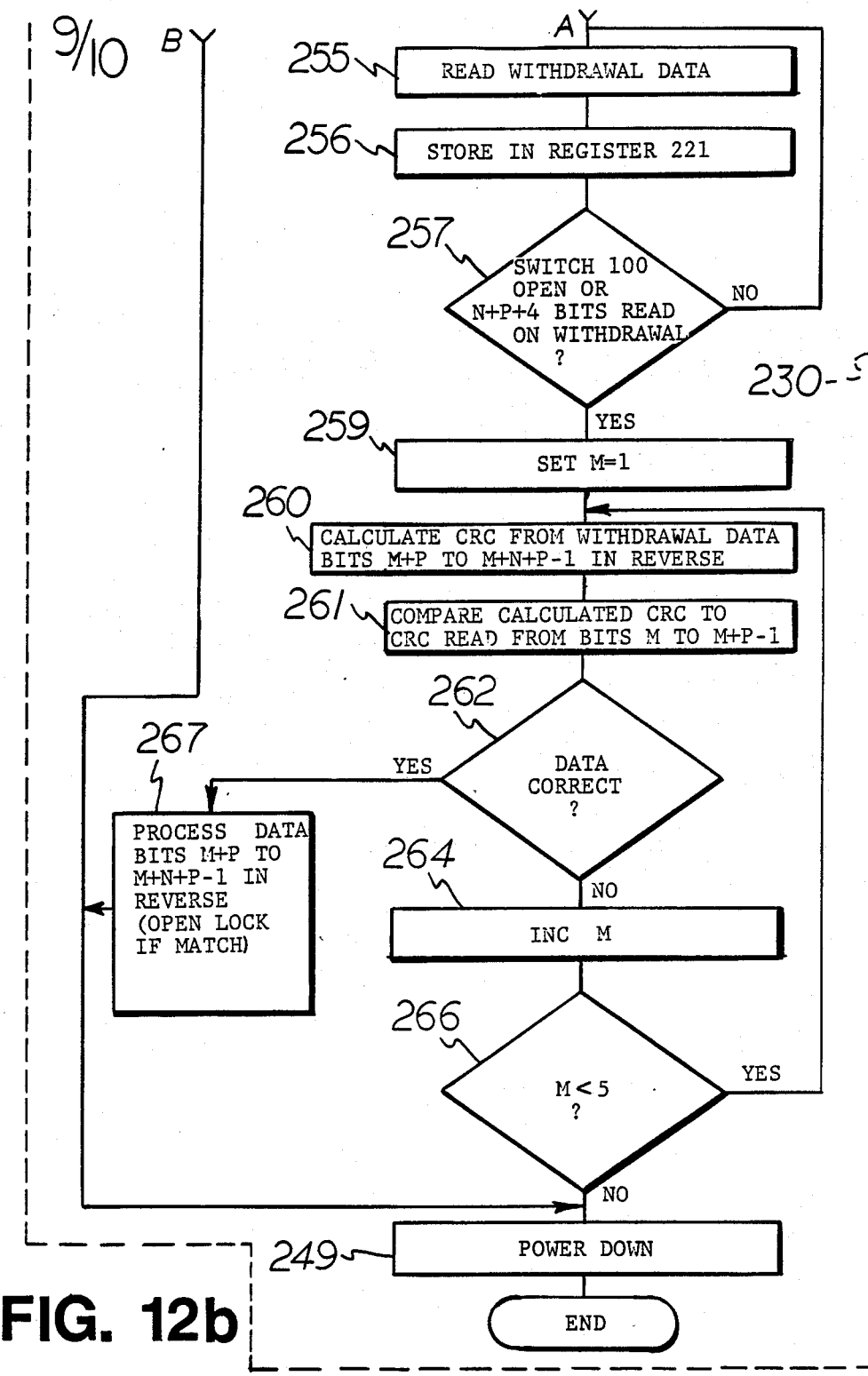

FIG. 12(a-b) is a flow chart illustrating a process for operating the locking apparatus 7 and includes a computer program 230 stored within the EEPROM 222 which program controls the microprocessor 220. When the key card 20 is inserted (step 231), the switch 100 is activated (step 232) and the electronic module 30 is powered up by connection of the batteries 219 to the circuitry within the electronic module (step 234). The activation of the switch 100 also resets the microprocessor 220 (step 236). In response, the microprocessor begins to monitor the output of the read circuit 225 and reads the data during insertion of the card (step 238).

The read head 55 produces a voltage spike whenever the polarity of the magnetic data bits underneath of it changes. As illustrated in FIG. 11 (b) the read circuit 225 provides two outputs, one for the track 19 and one for the track 21. Each of the outputs includes a voltage spike at a time when each of the oppositely polarized magnetic data bits 515 represented by the downwardly pointing arrows in FIG. 11(a) passes under the read head. The first true voltage spike 400 in the data portion 510 appears at the output of the read head corresponding to the first true data bit on the data track 21 and represents a binary 1 level. The next two true voltage spikes 401 and 402 appear at the output of the read head 55 which output corresponds to the data track 19 and represents two binary zero bits. The final two true voltage spikes 403 and 404 in the data portion 510 are provided by the output of the card reader which represents the track 21 and represent two binary 1 bits.

It should be noted that in the portion 514 of the output from the card reader representing each of the tracks 19 and 21, there are relatively small data spikes 237 and 239 timed with the arrival of the leading edge 216 of the data card 20 under the magnetic read head 55. This is due to the following. Before the leading edge 216 of the magnetic card 20 reaches the read head 55, the read head is not exposed to any magnetism, but when the leading edge 216 arrives underneath the read head and the first magnetic data bit in each of the tracks 19 and 20 passes under the read head, there is a transition from no magnetism to the magnetism of the polarity indicated by the upwardly pointing arrows. This change in magnetism produces the voltage spikes 237 and 239 at the output of the read head 55. The voltage spikes 237 and 239 are lesser in magnitude than the voltage spikes 400-404 corresponding to the true data bits within the data portions 510 because each of the true data bits corresponds to the change in magnetism from polarity in one direction to polarity in the other direction, whereas the voltage spikes 237 and 239 correspond merely to the change of magnetic polarity from a zero or neutral level to polarity in one direction, one-half the change experienced when a true data bit is read. The actual magnitude of the voltage spikes 237, 239 and the data voltage spikes 400-404 also depend on the speed at which the card 20 is inserted, greater speed causes a greater rate of change of magnetism detected by the read head 55 and therefore a greater magnitude of the resultant voltage spikes. Because the speed of card insertion may vary during a single insertion, the voltage spikes 237 and 239 cannot always be identified by simply measuring their peak to peak voltage.

The step 238 of reading the data on the data tracks 19 and 21 during insertion also includes a step of processing the outputs of the read head 55. Such processing is provided by the read circuit 225 including the peak detector 227. The peak detector 227 detects the peaks of the voltage spikes and is reset after the output of the card reader falls below a predetermined level. Detected peaks above a threshold level trigger a digital gate within the read circuit 225 to provide the output illustrated in FIG. 11(c) for transmission to the microprocessor 220. It should be noted that in the example illustrated in FIG. 11(c), the voltage spike 237 caused a pulse 243 which is similar to pulses 410-414 which correspond to the actual data bits 400-404, respectively. Consequently, the microprocessor reads data bits, 010011, instead of 10011. The microprocessor 220 stores these data bits, in the order read, in a serial register 221 which is part of the RAM 223 (step 240). The microprocessor similarly reads two CRC bits, binary one and binary zero in the portion 511 evidenced by voltage spikes 405 and 406 in FIG. 11(b) and pulses 415 and 416, respectively in FIG. 11(c). The CRC data is also stored in the register 221. Cyclical redundancy checking algorithms are well known in the art and need not be discussed further except to say that they serve the same function as parity bits. The CRC data corresponds to the actual data within the portion 510 and a match between the CRC data read from the card and a CRC value calculated by the microprocessor from the actual data indicates that the data has been read successfully.

Data is read during insertion until either the switch 101 has been activated or a total of "N+P+4" bits have been read (steps 241, 238, 240, 241, etc.), where "N" equals the number of actual data bits within the portion 510 and "P" equals the number of actual CRC bits.

Then, the microprocessor sets a variable "M" equal to one (step 242) for reasons discussed below. Then, the microprocessor calculates the CRC resulting from the first "N" bits of the data in the serial register 221, bits "M" through "N+M−1" (step 244). In many of the cases, the first "N" bits are in fact the data bits and nothing else, but in some occasions as illustrated in FIG. 11(c), the first "N" bits include the erroneous bit 243 and N−1 actual data bits. Then, the microprocessor 220 compares the calculated CRC to the binary number obtained from the next "P"bits, "M+N" through "M+N+P−1" (step 245) to determine if the CRC calculated from the presumed data contained within the first N bits equals the presumed CRC binary number read from the next "P" bits of the serial register 221 (step 245). A match of the calculated and read CRC indicates valid data. Because in the illustrated case, the first "N" bits are not the actual data bits, there is not such a match (step 246), and the microprocessor proceeds to increment the variable "M" (step 251). By way of example, this incrementing step may be performed by simply adding the number 1 to the parameter "M". In which case, the microprocessor determines whether the variable is less than five (step 252) and because the variable "M" currently equals two, the microprocessor loops back to the step 244 to calculate the CRC value for the bits "M" through "N+M−1" which now corresponds to the second through "N+1"bits. Then, the microprocessor compares the CRC value calculated in the step 244 to the value of the CRC read from the next "P" bits, "N+M" through "N+M+P−1". It should be noted that in step 244, the erroneous bit 243 is no longer considered to be part of the data bits, the data bits contained in the CRC calculation are in fact all the data bits within the data portion 510 and none else, and the CRC value read from the next "P" bits corresponds in fact to the CRC bits contained within the CRC portion 511 and none else. Therefore, the result of the comparison in the step 245 should be successful to indicate valid data provided that there were no other errors in reading the data. Such errors may result from improperly feeding the card into the card reader such that the operator, before completing the insertion, pulls back on the key card so that one or more of the data bits are read twice.

Next, the microprocessor proceeds to process the data of bits M to M+N−1 stored in the register 221 (step 248). If the key card 20 is a standard access card and the data contained in the data portion 510 matches a lock combination stored in the EEPROM 222, the microprocessor activates the driver 224 which drives the solenoids 226 to open the lock. On the other hand, if the data does not match one of the lock combinations, the microprocessor 220 will not open the lock. After the step 248, the microprocessor 220 may power down (step 249) the electronic module 30 to save power; however, in many applications it may be desirable to wait until the key card 20 is withdrawn from the lock before activating the solenoids and powering down the electronic module 30 to insure that the user removes his or her card and does not inadvertently leave it in the locking apparatus 7.

It should also be noted that if there was more than one improper data bit read into the serial register 221 before the actual data, the microprocessor will take additional iterations of the loop consisting of the steps 244, 245, 246, 251, and 252 until the erroneous data bits are shifted out of the set of bits treated as the actual data. By way of example, the aforesaid loop allows a total of four iterations to locate the actual data.

If there are four unsuccessful read operations and corresponding iterations of the steps 244, 245, 246, 251 and 252 the microprocessor clears the register 221 (step 254) and then waits to read data from the key card 20 during withdrawal from the locking apparatus 7. During such withdrawal which ordinarily occurs after the aforesaid four iterations, the same data portions 510 and CRC portion 511 are read from the key card (step 255) but in a reverse order and are stored (step 256) in the register 221. After the switch 100 has opened signifying that the card 20 has been removed or N+P+4 bits have been read (step 257), the microprocessor sets the variable M equal to one (step 259) and begins the process of analyzing the data read during withdrawal. The microprocessor initially treats the new bits M to M+P−1 read during withdrawal as the CRC bits in reverse order and bits M+P to M+N+P−1 read after withdrawal as the data bits in reverse order. In other words, the bit M (where M=1 initially) within the register 221 serves as the last CRC bit, the bit M+P−1 serves as the first CRC bit, the bit M+P serves as the last of the presumed data bits and the bit M+P+N−1 within the register 221 serves as the first presumed data bit, etc. Then, the microprocessor computes the CRC for bits M+P through M+P+N−1 in reverse order (step 260). Then, the microprocessor compares the CRC value calculated in the step 260 to the CRC value read in the reverse order from the bits "M" through "M+P−1" (step 261). If the comparison is successful (step 262) the microprocessor proceeds to a step 263 to process the data bits M+P to M+N+P−1 in the manner noted above for the step 248, but if it is unsuccessful, proceeds to increment the parameter "M" (step 264). If "M" is less than five (step 266) the microprocessor repeats the steps 260, 261, 262 and 263 or 264 to locate the actual data and actual CRC and eliminate erroneous data bits. If there are four unsuccessful attempts at locating and reading the actual data and actual CRC, the microprocessor does not open the lock and powers down (step 249).

It should be noted that even though FIGS. 10 and 11 illustrate that the data portion 510 contains only five data bits and the CRC portions 511 contain only two data bits, this is for simplified illustration only and that ordinarily the data portion 510 contains many bits, for example, 100 to 200 and the CRC portion 511 contains several bits for example, 6-32.

Figure 13A:
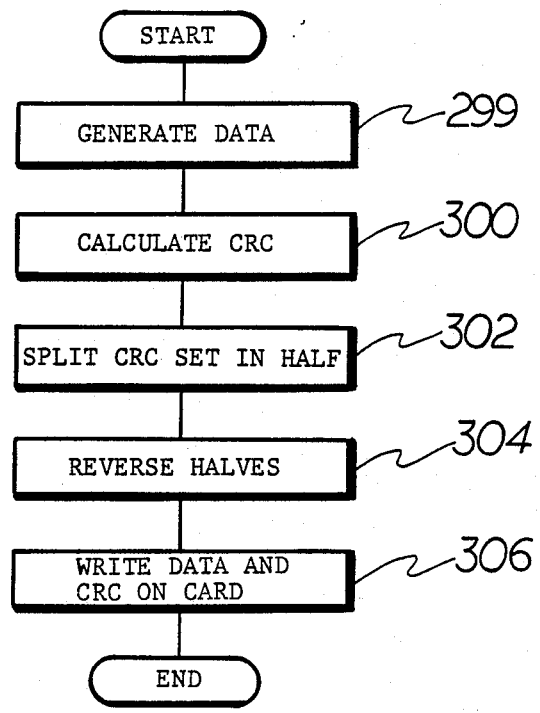
FIG. 13(a) is a flowchart of one possible computer program within a central management system for writing information including data on the key card.

FIG. 13(a) is a flowchart illustrating one type of process for coding or scrambling the CRC value in the CRC portion 511 of each of the tracks 19 and 21 of the card 20. However, it should be clearly understood that a variety of such coding processes may be utilized or no coding process utilized. Without a coding process, the actual CRC value is simply written into the CRC portion 511 and analyzed as discussed above. According to the FIG. 13(a) process, first a management system (not shown) including a random number generator produces suitable lock combination data for the portion 510 of the key card 20 (step 299). Then a computer also within the system calculates the CRC number as a set of bits corresponding to the data in the data portion 510 of the tracks 19 and 21 (step 300). Then the computer splits the set of calculated CRC bits in half (step 302) and puts the first half of the data bits as the last half of the CRC value and the last half of the calculated CRC data bits as the first half (step 304). For example, if the CRC value calculated in the step 300 was 01, after the steps 302 and 304, the resultant CRC value would be 10. Then, an operator inserts a blank key card into a writing device within the management system which is capable of writing data onto the key card. Then, the computer directs the writing device to write the resultant CRC set in the CRC portion 511 and the data in the data portion 510 of the tracks 19 and 21 (step 306).

Figure 13B:
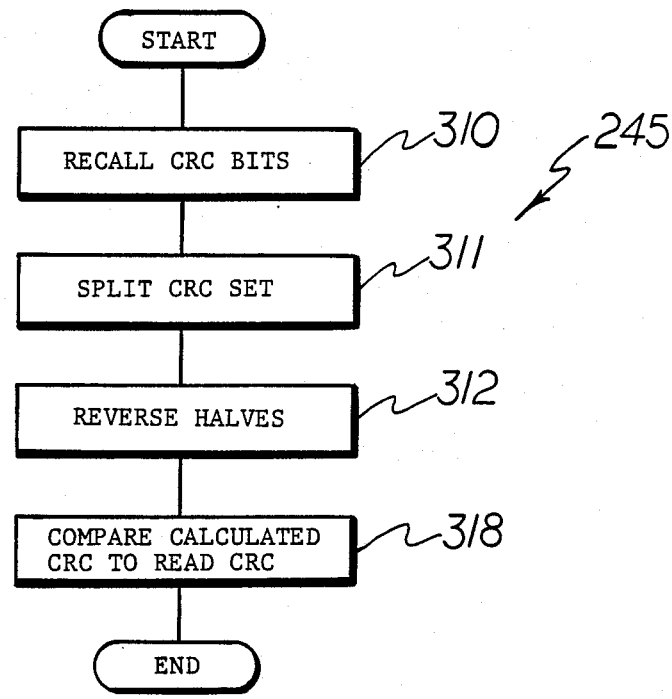
FIG. 13(b) is the corresponding program within the electronic lock for deciphering the information on the key card.

FIG. 13(b) is a flowchart illustrating a process for implementing the steps 245 and 261 of the algorithm 230 of FIG. 12, which process corresponds to the process for encoding the key card 20 with the CRC value as illustrated in FIG. 13(a). First, the microprocessor presumes that the CRC bits are the bits "N+M" through "N+M+P−1" for step 245 or bits M to M+P−1 in reverse for step 261 (step 310). Then, the microprocessor splits the CRC bits in half (step 311) and reverses the halves (step 312) so that in the aforesaid examples, the resultant CRC bits equal first the bit "N+M+P/2" and last the bit "N+M−1+P/2" for the step 245 or first the bit "P/2" and last the bit 1+P/2 for the step 261. Then, the microprocessor compares the CRC resulting after the steps 311 and 312 to the CRC calculated from the data portion 510 in the step 244 or the step 260 (step 318). This concludes one embodiment of the process for implementing the step 245 or the step 261 so that the microprocessor then proceeds to the step 246 or 262, respectively illustrated in FIG. 12.

The purpose of splitting and reversing the halves of the CRC value written on the key card 20 and calculated from the data field 510 is to insure that only a key card containing a valid lock combination is able to operate the lock. If an erroneous data bit is read into the microprocessor, then the microprocessor originally presumes an improper binary number to be the actual data (before the subsequent iteration of the steps 244, 245, 246, 251, and 252 or the steps 260, 261, 262, 264 and 266). However, the microprocessor also presumes an incorrect binary number for the CRC value read from the CRC field 511 because the presumed CRC value is shifted one bit due to the erroneous data bit. Consequently, without precaution, it is possible that the presumed data matches the presumed CRC value even though the probability of such coincidence is small. If this occurs, then the microprocessor will presume that the data bits it read, even though containing an erroneous data bit, are valid, and this erroneous data set may by chance match a lock combination stored in the EEPROM 222 and cause the lock to open. The chances of such correspondence of the erroneous data to the erroneous CRC depend to a large extent on the CRC process utilized to check the data. But, it should be noted that if the erroneous data set is only one bit incorrect, the majority of the bits of the erroneous CRC field should match the actual CRC set. Therefore, by splitting the actual CRC set in half and reversing the halves, and drastically changing the CRC value, it is much less likely that the CRC value calculated from the data stream which is altered by only one data bit will correspond to the incorrect CRC value read from the card after being split and having its halves reversed in order. Thus, the processes of FIG. 13 improve the security of electronic lock 7.

By the foregoing, an electronic locking apparatus embodying the present invention has been disclosed. However, numerous modifications and substitutions may be made without deviating from the scope of the invention. Therefore, the invention has been disclosed by way of illustration and not limitation and reference should be made to the following claims to determine the scope of the invention.

What is claimed is:

1. In an electronic locking apparatus having means for reading a set of actual data from a key card, the improvement comprising:
    memory means coupled to the reading means for storing said set of actual data and also storing false data erroneously read by said reading means,
    means for shifting through said memory means to the locations of a plurality of sets of said actual and false data, a first one of said sets including both said actual data and false data and a second one of said sets including said actual data and none of said false data,
    processing means coupled to the shifting means for determining that said first set contains some of said false data and said second set contains said actual data and none of said false data, and
    means coupled to said processing means for comparing said actual data within said second set to a lock combination stored within said locking apparatus and operating said locking apparatus if the comparison is favorable.

2. An improvement as set forth in claim 1 wherein said memory means includes means for storing said set of actual data and said false data serially in the order read by said reading means, said false data being read before and/or after said set of actual data.

3. An improvement as set forth in claim 1 wherein
    said key card includes validity-checking information which corresponds to said actual data and is readable by the reading means, and
    said processing means includes means for comparing said set of data to said validity-checking information to determine which of said sets is said second set of actual data.

4. An improvement as set forth in claim 3 wherein said processing means includes means for comparing said first set of data to a third set of data comprising said validity-checking information to determine that said first set of data includes something other than said actual data.

5. An improvement as set forth in claim 3 wherein said validity-checking information is a CRC set and said processing means includes means for determining a CRC set corresponding to said actual data and comparing said CRC set determined by said processing means to the CRC set read from said validity-checking information.

6. An improvement as set forth in claim 2 wherein
    the shifting means comprises means for locating said second set of actual data by shifting said actual and false data bit by bit serially.

7. An electronic locking apparatus as set forth in claim 1 wherein:
    the reading means includes means for reading said actual and false data provided serially on at least one magnetic track of said key card.

8. An electronic locking apparatus as set forth in claim 1 wherein:
    the reading means includes means for reading said set of actual data upon insertion and withdrawal of said key card from said locking apparatus.

9. An improvement as set forth in claim 1 wherein said key card includes a first set of cyclical redundancy checking bits which corresponds to said set of actual data and is read by said reading means, and said processing means includes means for calculating a second set of cyclical redundancy checking bits from said set of actual data, splitting said second set of cyclical redundancy checking bits read by the reading means into two halves and reversing the two halves, and comparing the calculated second set of cyclical redundancy checking bits to the split and reversed first set of cyclical redundancy checking bits.

10. A key card for a locking system having means for reading a first set of actual data contained on said key card and a second set of validity data contained on said key card, means for storing said first set of actual data read by the reading means and means for comparing said first set of actual data to said second set of validity data to determine if said first set of actual data is valid, said key card comprising:

at least one magnetic track containing said first set of actual data and said second set of validity data in linear form, said first set of actual data including a lock access combination and said second set of validity data including cyclical redundancy checking bits, and said second set of validity data being stored on said at least one magnetic strip in a predetermined order which is not the normal order.

11. A key card as set forth in claim 10 wherein there are two of said magnetic tracks containing said first set of actual data and said second set of validity in linear form, one of said tracks storing binary one data and the other track storing binary zero data.

12. A process for encoding a key card with lock combination data for a locking system having a key card reader, means for reading said key card and means for comparing said lock combination data read from said key card to a lock combination stored in said locking apparatus, said key card having at least one magnetic track, said process comprising the steps of:

calculating from said lock combination data a corresponding set of cyclical redundancy checking bits, reordering said cyclical redundancy checking bits in a predetermined order which is not the normal order of said bits; and writing the reordered set of cyclical redundancy checking bits on said at least one magnetic track on said key card along with said lock combination data.

13. A process as set forth in claim 12 wherein the step of splitting said set of cyclical redundancy checking bits is performed by splitting said set into approximately equal length parts.

14. In an electronic locking apparatus having means for receiving a key card, processor means for comparing lock combination data read from said key card to at least one lock combination stored in said locking apparatus, and means responsive to correspondence between said lock combination data on said key card and said lock combination stored in said locking apparatus for operating the locking apparatus, the improvement comprising:

means coupled to the processor means for reading said lock combination data on said key card during insertion of said key card into said means for receiving;

said processor means includes means for determining when said lock combination data on said key card is read successfully during insertion, based on data read during insertion;

means coupled to the processor means for reading said lock combination data on said key card during withdrawal of said key card from said means for receiving; and said processor means further includes:

means for determining when said lock combination data on said key card is read successfully during withdrawal, based on data read during withdrawal and independent of said data read during insertion; and means for activating the lock operating means when said lock combination data on said key card has been read successfully either upon insertion or independently upon withdrawal and said successfully read data corresponds to said lock combination stored in said locking apparatus.

15. An improvement as set forth in claim 14 wherein said key card includes validity-checking information which corresponds to said lock combination data stored on said key card and is readable by the reading means, and said processor means includes means for calculating validity-checking information from said lock combination data read from said key card and comparing the calculated validity-checking information to the validity-checking information read from the key card to determine whether the key card has been read properly.

16. An improvement as set forth in claim 15 wherein the calculating and comparing means is operative upon the lock combination data and validity-checking information read during insertion and independently during withdrawal.

17. An improvement as set forth in claim 14 wherein the reading means comprises a first sensor activated by the key card at the onset of insertion of said key and coupled to said processor means to activate said processor means to process said lock combination data read during insertion of said key card.

18. An improvement as set forth in claim 17 wherein said reading means further comprises a second sensor activated by the key card upon full insertion of said key card and coupled to said processor means to activate said processor means to process said lock combination data read during withdrawal of said key card, independent of said data read during insertion.

19. A key card as set forth in claim 10 wherein said predetermined order of said second set of validity data is determined by splitting said second set of data into two parts of approximately equal length, and reversing the order of the two parts.

20. A process as set forth in claim 12 wherein said step of reordering comprises the steps of:

splitting said set of cyclical redundancy checking bits into two parts; and reversing the order of said two parts of said set of cyclical redundancy checking bits.

* * * * *